United States Patent [19]
Harrison et al.

[11] Patent Number: 6,128,717
[45] Date of Patent: Oct. 3, 2000

[54] METHOD AND APPARATUS FOR STORAGE APPLICATION PROGRAMMING INTERFACE FOR DIGITAL MASS STORAGE AND RETRIEVAL BASED UPON DATA OBJECT TYPE OR SIZE AND CHARACTERISTICS OF THE DATA STORAGE DEVICE

[75] Inventors: Joel N. Harrison, Monte Sereno, Calif.; Satish L. Rege, Groton, Mass.; Frederick R. Carlson, Jr., Los Gatos, Calif.

[73] Assignee: Quantum Corporation, Milpitas, Calif.

[21] Appl. No.: 09/009,622

[22] Filed: Jan. 20, 1998

[51] Int. Cl.[7] ....................................... G06F 12/00
[52] U.S. Cl. ................... 711/202; 710/5; 710/6; 710/11
[58] Field of Search ...................... 710/5, 6, 11; 711/202; 360/54

[56] References Cited

U.S. PATENT DOCUMENTS

| | | | |
|---|---|---|---|
| 4,935,825 | 6/1990 | Worrell et al. | 360/54 |
| 5,021,946 | 6/1991 | Korty | 364/200 |
| 5,270,837 | 12/1993 | Chen et al. | 358/467 |
| 5,581,784 | 12/1996 | Tobagi et al. | 710/6 |
| 5,715,418 | 2/1998 | Atsatt et al. | 711/202 |
| 5,717,951 | 2/1998 | Yabumoto | 710/11 |
| 5,765,204 | 6/1998 | Bakke et al. | 711/202 |
| 5,875,349 | 2/1999 | Cornaby et al. | 710/5 |
| 5,881,311 | 3/1999 | Woods | 710/4 |
| 5,893,139 | 4/1999 | Kamiyama | 711/117 |

*Primary Examiner*—Meng-Ai T. An
*Assistant Examiner*—Nabil El-Hady
*Attorney, Agent, or Firm*—Michael Zarrabian

[57] ABSTRACT

A storage application programming interface (SAPI) engine is included in a hard disk drive (HDD). The SAPI engine operation is based on intelligent recognition of a plurality of different data objects characterized by type and/or size. The SAPI engine assigns a SAPI descriptor to data objects during its analysis recognition process. The SAPI descriptor identifies the type of the data object, and is used by the HDD to map the data object to a unique logical object address (LOA) space of the HDD tailored to characteristics of the particular disk drive. Using the SAPI descriptor assigned by the SAPI engine enables the HDD to more efficiently store data objects being sent by applications on a host computing system to the disk drive. The efficient storage by the HDD provides a system having improved access performance.

6 Claims, 6 Drawing Sheets

METHOD AND APPARATUS FOR STORAGE APPLICATION PROGRAMMING INTERFACE FOR DIGITAL MASS STORAGE AND RETRIEVAL BASED UPON DATA OBJECT TYPE OR SIZE AND CHARACTERISTICS OF THE DATA STORAGE DEVICE

FIELD OF THE INVENTION

The present invention relates to methods and apparatus providing efficient storage of user data within a digital data storage unit. More specifically, the present invention provides a method for recording data onto a disk drive in a manner which improves retrieval characteristics of the disk drive during playback of the data by categorizing the data as one of a plurality of common data types and recording the data on disk(s) in accordance with the particular data type.

BACKGROUND OF THE INVENTION

Computer data storage and retrieval architectures have become highly evolved. On the one hand, large mainframe input/output subsystems, such as the IBM 3390, follow a hierarchical design having a plurality of controllers extending from a central processing unit which negotiate a control path between main memory and a particular mass storage device and provide control timing of the data transfer. A separate hierarchy of connections may be established between the main memory and the mass storage device as a channel over which the data to be stored or retrieved actually flows. High performance and low storage latency are achieved by providing many storage devices which are connected redundantly to multiple central processing units (CPUs) via hierarchical control and data paths. This particular arrangement closely or tightly couples the mass storage device to the CPU and thereby renders practical the adaptation of operating systems and applications programs to take advantage of certain characteristics of the mass storage device, such as the hard disk drive. One early data recording format exploiting this tight coupling is known as "count-key-data" or "CKD". CKD is a variable block length recording scheme in which each record is recorded in its entirety in accordance with a "count" field which specified its address and length of the data. The key field provided the record's "key" or search argument, and was followed by the data field comprising the record information. By using the key field, a preliminary search for records of interest could be carried out at the drive controller level rather than exclusively at the host CPU level. The CKD format is to be contrasted with the more modem and prevalent "fixed block architecture" (FBA) format.

Beginning about twenty years before the filing of this patent application, a merchant market arose for hard disk drives as storage device commodities sold separately from main frame and mini-computers. These merchant market hard disk drives found application and acceptance in computerized word processing systems and in other applications where floppy disk systems provided insufficient storage capability. Since these low cost hard disk drives developed to meet the growing limitation of floppy disk drives, interfaces between the computer-based applications and the hard disk drives developed along the lines of the floppy disk drive. Those low level interfaces simply specified e.g. a storage device, a volume number, a "cylinder", a head (which specifies one track within the cylinder of tracks) and a physical record or "sector" address for a block of data to be written or read back. The drive responded directly to the controller by stepping a head actuator to the cylinder location and selecting the appropriate head. In other words, the interface specified a physical storage space, as indicated by the specific cylinder, head and sector (CHS), which was made unique for each disk drive, and the controller knew the approximate state of the drive in real time. The so-called "ST-506" interface, meaning the interface used by the Seagate Technology ST-506 5¼ inch, 5 megabyte hard disk drive, found widespread use in the 1980s during the development and proliferation of the now-ubiquitous personal computer.

Later, hard disk drive designs became more sophisticated and began including embedded disk drive controllers. With this development it became practical for the disk drive itself to begin mapping logical block address (LBA) space to physical storage locations on the disk drive. The computer host and its drive controller specified LBAs which the on-board drive controller translated into physical cylinder, head and sector values, and direct control of storage adddresses on the drive thereupon became masked to the host controller. One example of an early bus level interface is provided by commonly assigned U.S. Pat. No. 4,639,863 of co-inventor Harrison and others entitled: "Modular Unitary Disk File Subsystem", the disclosure thereof being incorporated herein by reference. This plug-in PC bus level hard disk drive led directly to the development of the so-called "integrated drive electronics" or IDE interface, later followed by an "enhanced integrated drive electronics" or EIDE interface, which has become an industry standard drive interface convention.

Beginning in 1981, an industry standards working group developed and the American National Standards Institute (ANSI) later adopted a "small computing system interface" (SCSI) specification (X3.131-1986) which provides another higher level interface structure implementing some of the more advantageous channel disconnect and reconnect features associated with the mainframe mass storage systems such as the IBM 3390 subsystem mentioned above. A pioneering hard disk drive implementing SCSI is described in commonly assigned U.S. Pat. No. 4,783,705 to Moon et al. and entitled: "High Capacity Disk File with Embedded Sector Servo and SCSI Interface", the disclosure thereof being incorporated herein by reference. Over the years, the SCSI specification has evolved to provide wider bandwidth and higher data transfer speeds, but its command structure has remained quite stable.

In SCSI a command descriptor block (CDB) is issued by a SCSI initiator to a SCSI target over the bus. The CDB includes e.g. five bytes: operation code, LBA (2.5 bytes), block transfer length and control byte. The operation code tells the target how long the CDB will be and what operation, such as read or write, the target is to perform. The LBA tells the target where the user data is expected to be located in LBA space. A typical block size is 512 bytes of user data. The block transfer length tells the target how many blocks of data beginning at the LBA are to be transferred by this transaction or sequence. And, the control byte is used for special purposes such as command linking or queuing.

Figure 1A:
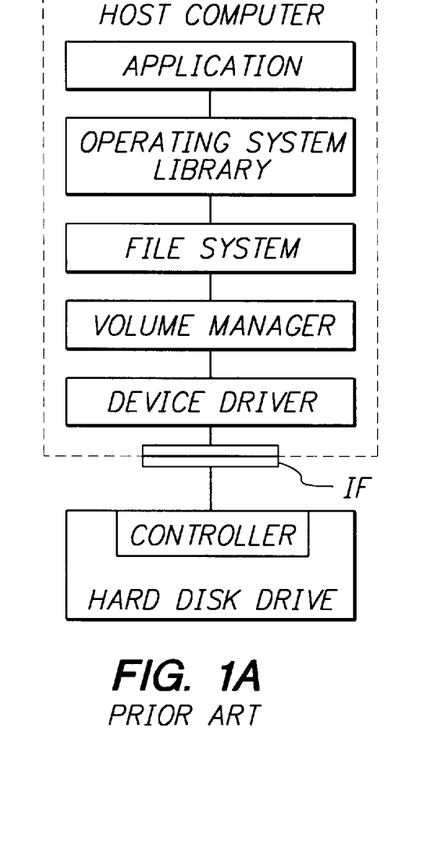
FIG. 1A is a block diagram of a conventional host computing system and hard disk drive, showing a hardware interface between the host and drive, and showing plural functional software layers operative within the host.

Regardless of the particular host-to-disk interface, the present state of the art is for a computer host to control LBA storage in a hierarchical or layered arrangement. As shown in FIG. 1A a host computer may include an application layer, an operating system library layer, a file system layer, a volume manager layer, and a device driver layer. The application, operating system library, file system, volume manager and device driver are most frequently embodied as software within the host computer or computing system.

A computing application which is active within the host computer at an uppermost layer may require a data unit, byte, block or record comprising one or more blocks to be written to, or retrieved from, e.g. disk storage. The request for the records is sent from the application layer to the next lower, operating system library layer. The operating system library together with the file system and volume manager layers are primarily responsible for scheduling accesses to storage including disk storage and for converting the specific request for a data record into a logical block address and block length value for transmission to the disk drive. This process includes identifying the particular storage resource which will be called upon to service the request by the application, and therefore specifies a particular device driver, which comprises a fifth level in the FIG. 1A depiction.

The device driver is conventionally a software control program or routine which includes the code needed to use an attached peripheral device, such as a generic hard disk drive. The driver is device-specific, and so it takes into account the particular physical and electrical characteristics of the device to enable the host to communicate with the device. While the device driver layer is intended to describe the physical characteristics of a particular peripheral device, in practice only a few generic devices are supported by available device drivers, and actual physical hardware may differ widely from the generic model supported by the particular device driver. The fact that there is a wide disparity between the logical model, as seen by the device driver software, and the actual physical hardware, and that this disparity is unknown to the host and its applications, is a fundamental drawback of the prior approaches which have led and contributed to the present invention.

Continuing with FIG. 1A, an interface structure IF enables the host computer to connect electrically to e.g. a peripheral storage device, such as a hard disk drive. The interface may be embodied as a cable or bus structure, and it may adhere to a signaling convention, such as EIDE or SCSI. Generally speaking, the interface connects to an embedded controller within the hard disk drive which receives and acts upon commands from the host, and returns status indications, adjunct to the primary function of recording and retrieving data blocks to and from internal storage disks.

Figure 1B:
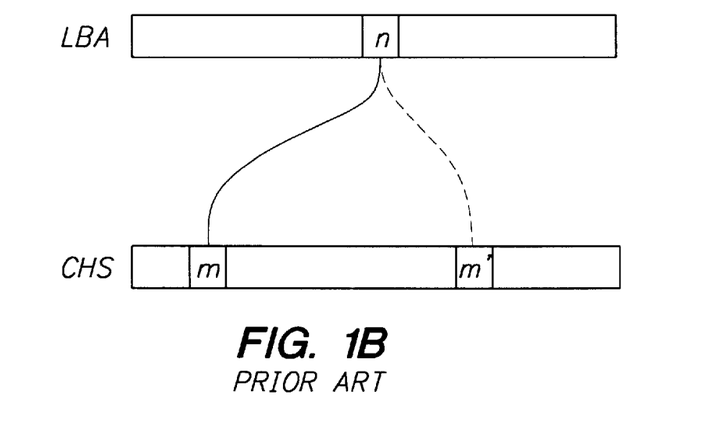
FIG. 1B is a diagram of conventional static mapping of linear logical block address space to physical cylinder, head and sector space within the hard disk drive of FIG. 1A.

As shown in FIG. 1B, the device driver receives the request for storing or retrieving a particular data block, e.g. block n, from the operating system, and maps out the address of block n within linear address space comprising the LBA of the hard disk drive. The embedded controller within the hard disk drive translates the LBA for block n into a physical cylinder, head and sector location (CHS) for block n in accordance with an internal static mapping or translation process which is not visible to the host application. Logical block n is always mapped to physical space m (except in the infrequent instance where physical space m is defective and the mapping is rerouted to a spare location m', shown in broken line in FIG. 1B). This static mapping process has the property that it is a one-for-one map, a one-for-one function: for every logical block at address n there is one and only one physical space at location m within the disk drive hardware. This static mapping process has the additional property that it is unknown to, and therefore transparent to, the host CPU. And, the process has the performance limiting property that it is dependent entirely upon the LBA values and does not take into account the type or kind of data or the use to which the data will be put by the application program or operating/file system.

In order to maximize data storage, disk drives typically implement data track zone formats on disk surfaces. Data track zones are needed to adjust to the fact that while the disk rotational velocity remains constant, the relative velocity between the disk and the flying head varies with the disk radius. By implementing data track zones, transfer rates are changed to be optimized for a minimum radius of a particular zone of data tracks. Data on tracks of outer zones is written and read at rates faster than data recorded on tracks of inner zones. A long record may extend across both zones and storage surfaces, thereby necessitating handling of rotational latencies, as well as track seeking and head select delays or interruptions. Since the mapping is carried out internally within the drive, the host computer and the host applications or disk operating system programs do not have direct control or knowledge of the data patterns directly written to the storage surface.

One important reason that the drive's internal mapping process is invisible to the host computer is that each disk drive product design may have many variables, such as number of disks and heads, number and location of radial data zones defined on each disk storage surface, data transfer rates for each of the data zones, block lengths, interleaves, error correction code processes, etc. Since the drive owns its own internal static data mapping process, the drive may very easily emulate a generic drive contemplated at the device driver layer or level.

For example, a real hard disk drive product (Quantum Bigfoot 1.2 AT) may have a single storage disk with two storage surfaces and one head per surface. Each surface of the real drive may be organized into 16 radial zones, and have 5738 tracks per surface (cylinders), for a total of 11,476 tracks on both surfaces. A total number of user data sectors is 2,512,844, with 512 user bytes per sector plus overhead. The outermost data zone includes 273 sectors per track, while the innermost data zone includes 144 sectors per track. All of the tracks are interrupted by 96 servo wedges or spokes which extend generally radially across each disk surface. Information not available to the host in the wedges is used for controlling head position and for locating user data block locations in a track being followed by a particular head. In this example the real drive has a formatted capacity of 1286.57 megabytes. Yet, an entirely different logical addressing format may be used to describe this real drive at the device driver layer of the host. One logical address format used to emulate this particular drive by widely available device drivers is 2492 logical cylinders, 16 heads and 63 sectors per track. While this virtual logical addressing format yields an overall storage capacity of 1286.11 megabytes, it presents a very misleading picture to the host computer of the actual physical geometry of the real drive. The host has no knowledge of high speed, high bandwidth outer zone locations, or of the low speed, low bandwidth inner zone locations. It has no control over whether a record will be mapped within a single zone at a uniform data transfer rate, or will be spread out across several zones and buffered by an on-board cache memory of the drive. The host has no idea whether the disk includes one storage surface, or 12 surfaces, or two heads or 16 heads. The host does not know if the sector patterns are skewed from surface to surface to accommodate head select latencies, etc.

Thus, one drawback of the current approach of fitting a virtually unlimited number of physical device designs into a relatively few number of logical addressing formats for which there are widely available device drivers, is that the real drive's physical plant storage space and layout design is not necessarily considered or optimized by the host in specifying or allocating LBA space. This is primarily because the use of 512 bytes of data as the conventional block size is no longer useful to current disk storage surface configurations from the disk drive's point of view, nor is it useful from an application's point of view. Another drawback is that certain data types, such as multimedia video and sound files, require a high level of continuity and speed in playback, which is or may not be achieved by the drive in carrying out its own internal data mapping arrangement.

Recently, it has been proposed to distribute mainframe-like computing functions at various locations within an enterprise or across a network. A number of proposals have been made for redundantly attached inexpensive (more recently "independent") drives (RAID) in order to assemble huge storage arrays out of smaller, redundantly mirrored or backed up, devices. Even more recently studies have been undertaken to define and specify "network attached storage devices". However, even with the introduction of distributed storage in parallel with the proliferation of the "worldwide web", the fundamental storage control strategy has remained that a host will specify an LBA and present data to a storage resource. In response to the request, the storage resource (e.g. hard disk drive) will map that LBA to a physical location without particular regard to the kind or type or size of data being sent for storage, or the particular characteristics of the storage location as either particularly suited or somewhat unsuited for the particular data, or the particular requirements of the host program or operating system.

Thus, a hitherto unsolved need has remained for an improved mass storage interface which enables dynamic remapping and storage of data within the device to be carried out, based upon a determination of the type or size of data being recorded and the characteristics and behaviors of available storage space within the device.

SUMMARY OF THE INVENTION WITH OBJECTS

A general object of the present invention is to provide a storage application programming interface (SAPI) for digital data mass storage and retrieval based upon an intelligent recognition of a plurality of different data objects characterized by type and/or size within a mass storage device in a manner improving storage device performance and overcoming limitations and drawbacks of the prior art.

A more specific object of the present invention is to enhance the performance of a hard disk drive by providing a novel internal data object analysis process which analyzes data objects being sent to the disk drive from a host or hosts and stores the data objects at storage locations of the disk drive which provide appropriate access performance, depending upon determined particular types of the data objects.

Another more specific object of the present invention is to provide a plurality of known SAPI descriptors and select a particular descriptor for a data object which enables a data storage device, such as a disk drive, to map from a host-supplied primary LBA space to a unique logical object address (LOA) space tailored to characteristics of the particular data storage device in a manner which is transparent to the host computing environment in which the disk drive is situated.

Another more specific object of the present invention is to provide a disk drive with an internal operating method which multiplexes the drive among a wide variety of adaptations and uses, based on determined ones of plural types of data objects being sent to the drive for storage.

Another more specific object of the present invention is to provide a SAPI implementation engine within a mass storage device such as a disk drive which determines and attaches a particular SAPI descriptor to a data object and which periodically revises a global storage strategy for the device based upon SAPI descriptors and record extents presently in storage and physically rearranges the records to achieve improved storage performance at the host level.

One more specific object of the present invention is periodically to study the various data types of records stored on a hard disk drive and determine a more efficient layout of those records and reorder the records in accordance with that determination as a background operation carried out by an embedded controller of the disk drive in a manner which is transparent to the host computing system.

These and other objects, advantages, aspects and features of the present invention will be more fully understood and appreciated by those skilled in the art upon consideration of the following detailed description of a preferred embodiment, presented in conjunction with the accompanying drawings.

DETAILED DESCRIPTION OF PREFERRED EMBODIMENTS

Figures 2, 3:
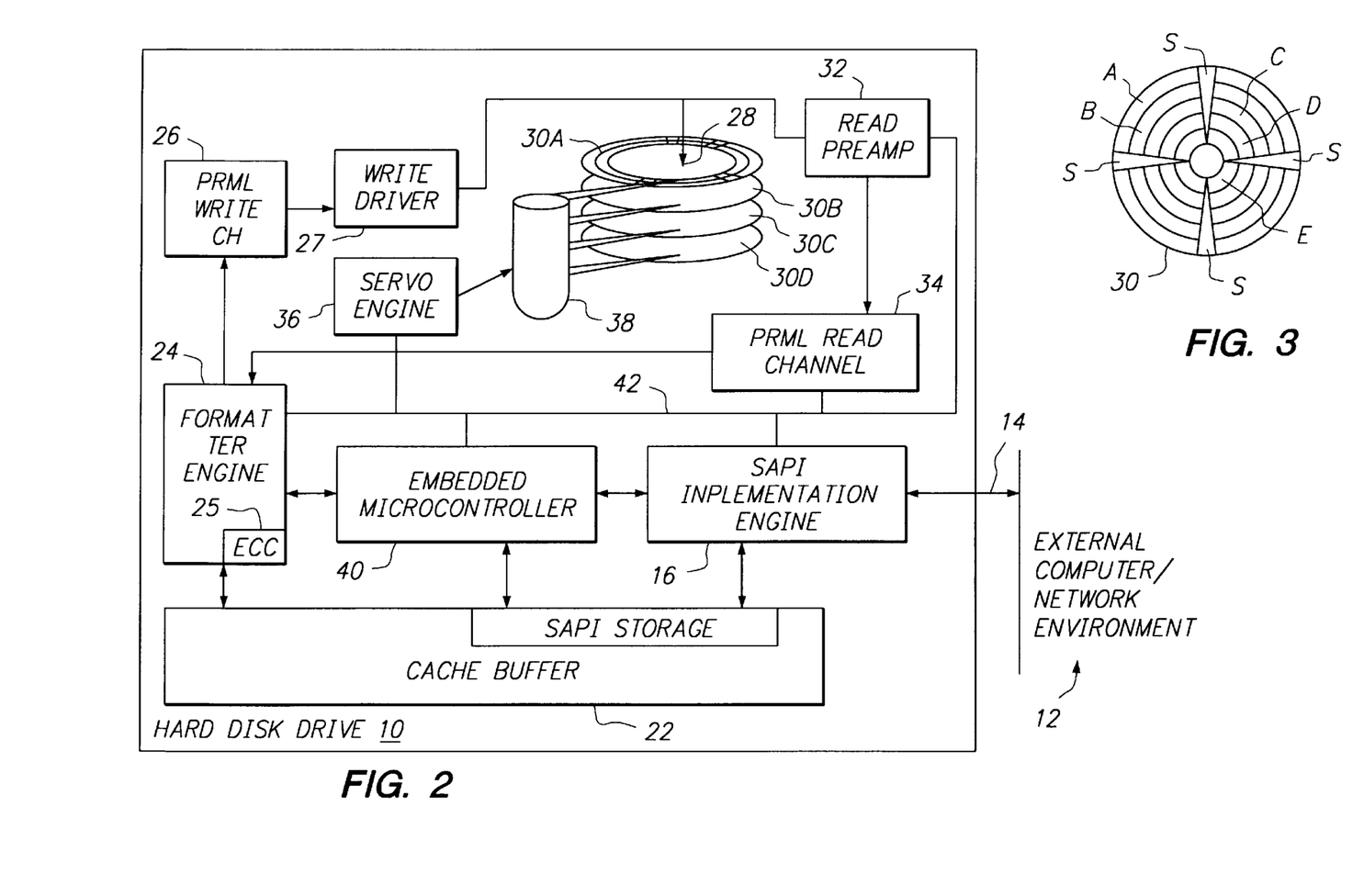
FIG. 2 is a detailed block diagram of a hard disk drive incorporating a storage application programming interface (SAPI) engine in accordance with principles of the present invention.
FIG. 3 is a diagrammatic plan view of a zoned data track layout of a representative one of the disk storage surfaces of the FIG. 2 disk drive.

With reference to FIG. 2 a mass storage device, such as a hard disk drive 10, is connected to an external host computer or network environment 12 via an interface structure 14. The host computer may be implemented and operating in accordance with the FIG. 1 generalization. The interface structure 14 may be conventional, such as SCSI or EIDE, or it may be an equivalent non-standard bus-level interface structure. Also, it may be an electrical interface or an optical-fiber channel-based interface.

Figure 4:
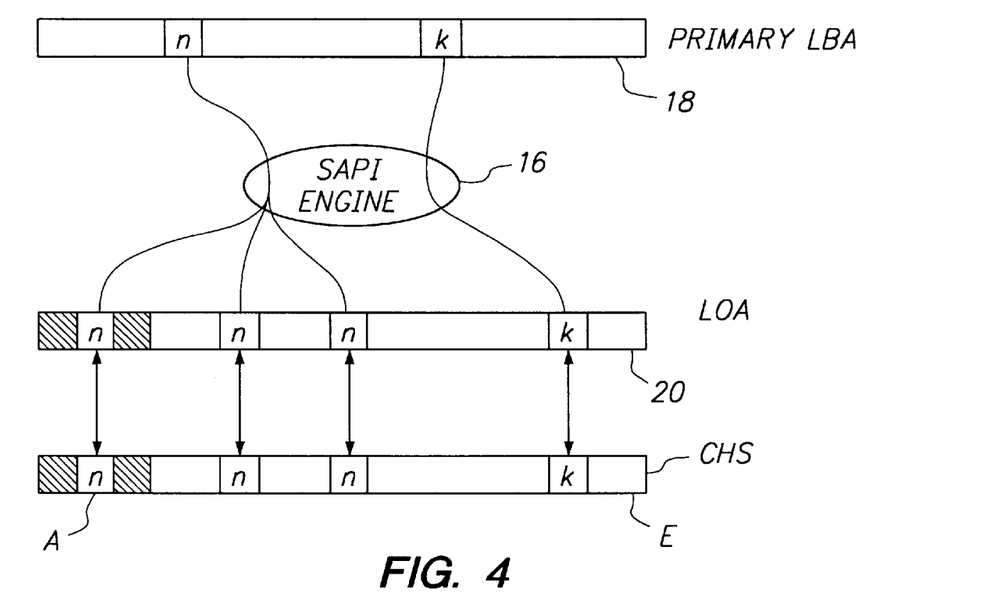
FIG. 4 is a diagrammatic view of dynamic mapping of primary LBA space to LOA space carried out by the SAPI engine within the FIG. 2 hard disk drive.

In accordance with principles of the present invention, and as shown in FIGS. 2 and 4, the drive 10 essentially includes a storage application programming interface (SAPI) engine 16 which interconnects the drive 10 to its external operating environment 12 via the interface structure 14. The structural and operating characteristics of the SAPI engine 16 will be explained in greater detail hereinafter.

By way of completeness of explanation of FIG. 2, the illustrated drive 10 further includes a volatile solid state cache buffer memory array 22 which may be implemented as a refreshed DRAM array. The cache buffer 22, as illustrated in FIG. 2, includes a buffer data and refresh manager which generates addresses to facilitate byte and block transfers to and from the buffer array. A formatter engine 24 is provided for locating physical data block addresses on an array of rotating data storage disks 30. The formatter engine 24 preferably includes at least an ECC encoder and decoder 25 and may include a fully implemented hardware ECC engine for locating and correcting error bursts. A partial response, maximum likelihood (PRML) signaling convention is employed by the disk drive 10. Accordingly, a PRML write channel 26 receives formatted data from the formatter 24 and scrambles/precodes the data in a conventional fashion. The precoded data is then applied to a write driver circuit 27 which converts the logical serial data stream into a write current (with suitable precompensation if desired) and selects a head 28 to which the write current is to be applied once a target data sector is reached.

Four disks 30A, 30B, 30C and 30D are shown in stacked relationship upon a rotating spindle in the FIG. 2 hard disk drive 10. Each disk 30 defines a multiplicity of concentric data tracks. As shown in FIG. 3 the tracks are arranged into e.g five radial bands or zones A, B, C, D, and E, with each zone having a data transfer rate adjusted for relative head-to-disk velocity at an inside radius of the particular zone. Fewer, or many more, zones may be provided in an actual implementation of the exemplary drive 10. (As noted above, a real hard disk drive, the Quantum Bigfoot 1.2 AT implements 16 radial data zones, with e.g. 383 tracks per zone). A series of radially extending servo sectors S divide the data zones and provide a servo engine 36 of the drive 10 with position feedback information which is used to control head position during track seeking and track following operations of e.g. a rotary voice coil actuator structure 38.

A separate data transducer head 28 is provided for each disk storage surface in a fully outfitted drive 10 (in some implementations only one surface of one or more of the disks is actually used, and a head is not provided for a surface which is not used). The transducer head 28 is formed as a slider having an air bearing surface which flies in very close proximity to the very smooth storage surface (e.g. 1–2 micro inch flying height). A two element, inductive write, magnetoresistive (MR) read, transducer is a preferred implementation of the head 28.

During read mode, a read preamplifier 32 preamplifies analog signals modulating a bias current applied to the MR read element which represent the recorded user and servo data. A PRML read channel provides channel filtering and equalization, digital quantization and Viterbi detection for most likelihood detection of the quantized data symbols. The detected symbols are then passed back through the ECC engine 25 and the formatter engine 24 and decoded data is stored temporarily as blocks in the cache buffer 22 before being returned to the host. The servo engine 36 receives servo values read from the sectors S via the PRML read channel 34 and controls operation of the rotary voice coil actuator structure 38 in conventional fashion.

A programmed micro-controller 40 is embedded within the hard disk drive and may be implemented as one or more programmed microprocessors having control firmware stored in certain locations of the cache buffer 22. Since the cache buffer 22 is volatile and the control firmware is otherwise lost after power-down of the drive 10, the firmware may be stored in reserved storage locations of a disk 30 and read out to the cache during a power-on-reset routine stored in a read only memory portion of the embedded microcontroller 40. An internal control bus 42 interconnects the embedded microcontroller 40 with the other electrical elements of the drive 10. The embedded microcontroller 40 is tightly coupled to the SAPI engine 16 and the formatter 24, and may perform more or less of the functions of each, depending upon a design balance between hardware and software complexity, and drive performance requirements.

For example, the SAPI engine 16 can be constructed in part as an application specific integrated circuit (ASIC) section or stand-alone, and it may call upon the embedded microprocessor 40 to perform certain functions, such as typing each particular data object, and in calculating the parameters of a particular dynamic mapping strategy, depending upon determined data unit type.

Essentially, the SAPI engine 16 learns, discovers or is informed that a particular user data object is of a particular type or category which is meaningful to the drive 10. With this knowledge, the SAPI engine 16 establishes an intelligent mapping paradigm between a conventional primary or device driver LBA linear address space 18 and a new LOA space 20 located within the drive 10 at an indirection level illustrated as the SAPI engine level in FIG. 4. From a global perspective, the mapping from the primary LBA space 18 to the LOA space is a dynamic (one-to-one, one-to-many, many-to-one and many-to-many) mapping paradigm we herein define as SAPI.

In a SAPI "one-to-many" mapping example shown in FIG. 4, the SAPI engine 16 determines that a single data object n (or page n, record n, file n, etc.) is frequently read back to the host. For example, n may be a data unit, record or file implementing a graphical user interface (GUI) web page within an Internet server and has a characteristic of being written once and read back hundreds, if not thousands, of times by the host before ever being rewritten. This characteristic of data object n of being "read frequently" is taken into account by the SAPI engine 16. Depending upon availability and location of storage space on the disks 30, the SAPI engine 16 may store one or more copies of the data object n in an outermost zone A of a storage disk 30, and may store other copies of data object n at other locations on the storage disks 30 so as to minimize rotational, seek and head switch latencies associated with particular real drive 10 (see discussion of FIG. 9 hereinafter).

Mapping of single logical block n of primary LBA space 18 to multiple spaces of the LOA space 20 is done in an "intelligent" fashion by the SAPI engine 16 and disk drive 10. By "intelligent" is meant that the SAPI engine 16 (and/or microconotroller 40, depending upon particular SAPI implementation details not needed for practice of the present invention) knows not only the data type of data unit n, but also the particular format geometry and storage resources availability of the disk drive 10. Based upon these two, as well as other, variables the SAPI engine 16 constructs a dynamic mapping scheme for data object n to physical recording space of drive 10 in a manner which results in multiple physical storage locations and resultant improved performance of drive 10 when it is later called upon by the host to read and return a copy of data object n. This example trades available data storage space for increased disk drive performance.

As a further example set forth in FIG. 4, a different data object k may have a data type or characteristic of being "used infrequently". That is to say, data object k may be frequently written to disk, but rarely, if ever, read back to the host. For example, data object k may be a log which records the dates and times that host is actively performing some application or task. Data object k is therefore an excellent candidate for storage in a low bandwidth, low transfer rate zone, such as on a track within radially innermost zone E of disk 30 as shown in FIG. 3. In this case, SAPI engine 16 maps object k to a single physical storage address in radially innermost data zone E.

Other examples include a "many-to-one" situation in mapping from primary LBA space to LOA space. It is conceivable for some data types that multiple blocks having different primary LBA addresses 18 will map to a single LOA address 20. For example, sparse arrays are composed of pieces that all look the same, such as all zeros or all ones or minus ones. If the SAPI engine 16 determines that an incoming stream of blocks are identical portions of a sparse array, they may be mapped to the same single LOA block space, with a consequent significant savings of disk drive storage capacity.

It turns out that many of the data structures that require storage on a disk drive include the same miniature array which is replicated over and over, and the many-to-one data type enables the same miniature data array to be recorded at a single location on the disk 30. The SAPI mapping function will then cause any read to any one of the primary LBA spaces of the miniature array to be mapped to the single LOA space 20 at which the array is actually recorded on the disk. One of the ways that the SAPI engine can determine that a subsequent object is identical to a previously recorded object is to compare ECC remainder bytes generated by the ECC encoder 25. This comparison is known as a "hash" which is easily carried out at the disk drive controller level. The SAPI engine 16 can perform a hash as an initial step and thereby tentatively identify identical objects. Then, a more detailed look of the objects to determine identicality can be carried out as a background process by a housekeeping routine (see discussion of FIG. 8, below). The process of mapping many identical objects to a single storage location is one form of run length encoding which is carried out by the SAPI engine 16.

Once the SAPI engine 16 has dynamically remapped the data objects n and k, for example, a conventional mapping process within drive 10 directly or statically maps the LOAs to physical disk storage space, as represented by actual cylinder, head and sector values.

Figure 5:
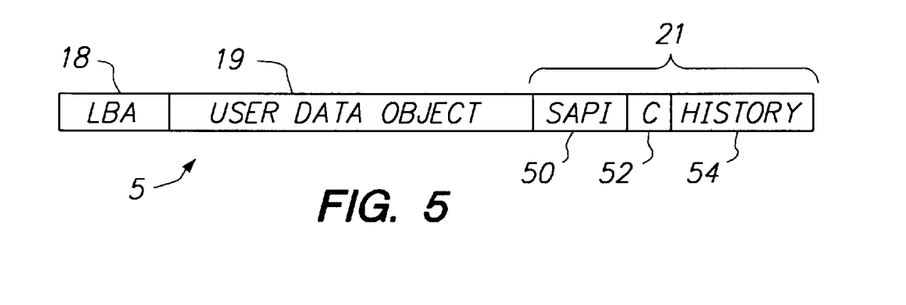
FIG. 5 is a diagram of a data unit record having a SAPI descriptor field in accordance with principles of the present invention.
Figure 6:
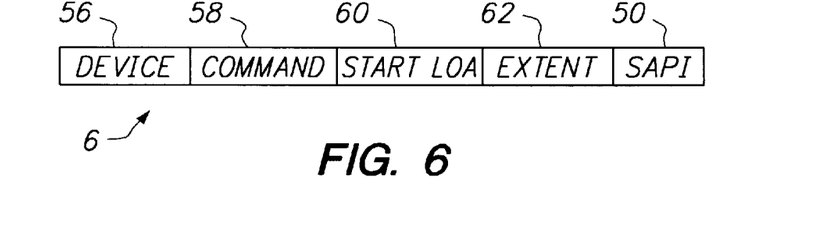
FIG. 6 is a diagram of a storage command having a plurality of fields including a SAPI descriptor field in accordance with aspects of the present invention.

Ideally, each data object is characterized by having a SAPI descriptor field 21. As shown in FIG. 5, a data object 5 stored on disk 30 includes a field for the LBA 18, field for the unit or block data, and an additional overhead field 21 including a SAPI descriptor field 50, a confidence level field 52 and a history field 54. Other fields may also be included. The overhead field 21 is uniquely associated with the data object 5. Alternatively, and perhaps less satisfactorily, a disk drive storage command 6 which is delivered to the drive 10 separate from the data object 5 may have a format as shown in FIG. 6. This command format 6 would typically include a device identifier field 56, an operation or command field 58 (such as read/write, etc.) a starting LOA field 60 and a record unit or block extent field 62. Additionally, a SAPI descriptor field 50 may be appended by the host at e.g. the application, operating system library, file system, volume manager, or device driver layer (see FIG. 1A) which is appropriate to the particular object being transferred may be included in the command 6. If the host is specially programmed to add SAPI descriptors to data commands 6 or data objects 5, the drive may initially rely on the host SAPI determination and accord a very high confidence level to the SAPI descriptor. On the other hand, the history field 54 may not be completed by the host, and would be updated by the drive 10 every time an access is made to the particular object. Irrespective of the incoming location of the SAPI field 21, the SAPI implementation engine 16 of disk drive 10 will associate the SAPI information with the incoming record by writing the SAPI into the SAPI field 21 before recording the incoming object to a disk location(s), in accordance with an operating routine set forth in FIG. 7. Later on, as a background routine set forth in FIG. 8, the SAPI implementation engine 16 may refine the SAPI descriptors for objects and relocate the objects to different disk storage locations, based on refined SAPI descriptors developed for each object in relation to the other objects.

In one preferred form the disk drive SAPI engine 16 determines a SAPI value or descriptor which is most appropriate for an incoming data object. Software routines within the SAPI engine 16 look at incoming commands and data objects, and based on generally available criteria, the SAPI engine 16 is able to determine particular object types. For example, the drive itself may be laid out by way of a formatting routine to store files associated with a Windows 95™ file system. Accordingly, the SAPI engine is able to determine which blocks a particular application is reading and writing, and more importantly whether those blocks are part of the bootstrap load file, the file system itself, the file directory or file allocation table, or are meta-data, or general user data records, or logs of events which rarely, if ever, will be read out. If the drive is able to determine that the data is e.g. Windows 95 data, for example, the drive CPU 40 can read the boot block and determine which version of Windows is being used, as well as the version of the particular application software running at the uppermost level of the computer. With this information, the drive 10 then can know what the application expects from disk storage and it can then lay out the data storage patterns in a manner more closely tailored to the application's likely usage of disk data. File names, particularly file suffixes, also indicate a likely application within a multi-tasking operating environment.

Figure 7:
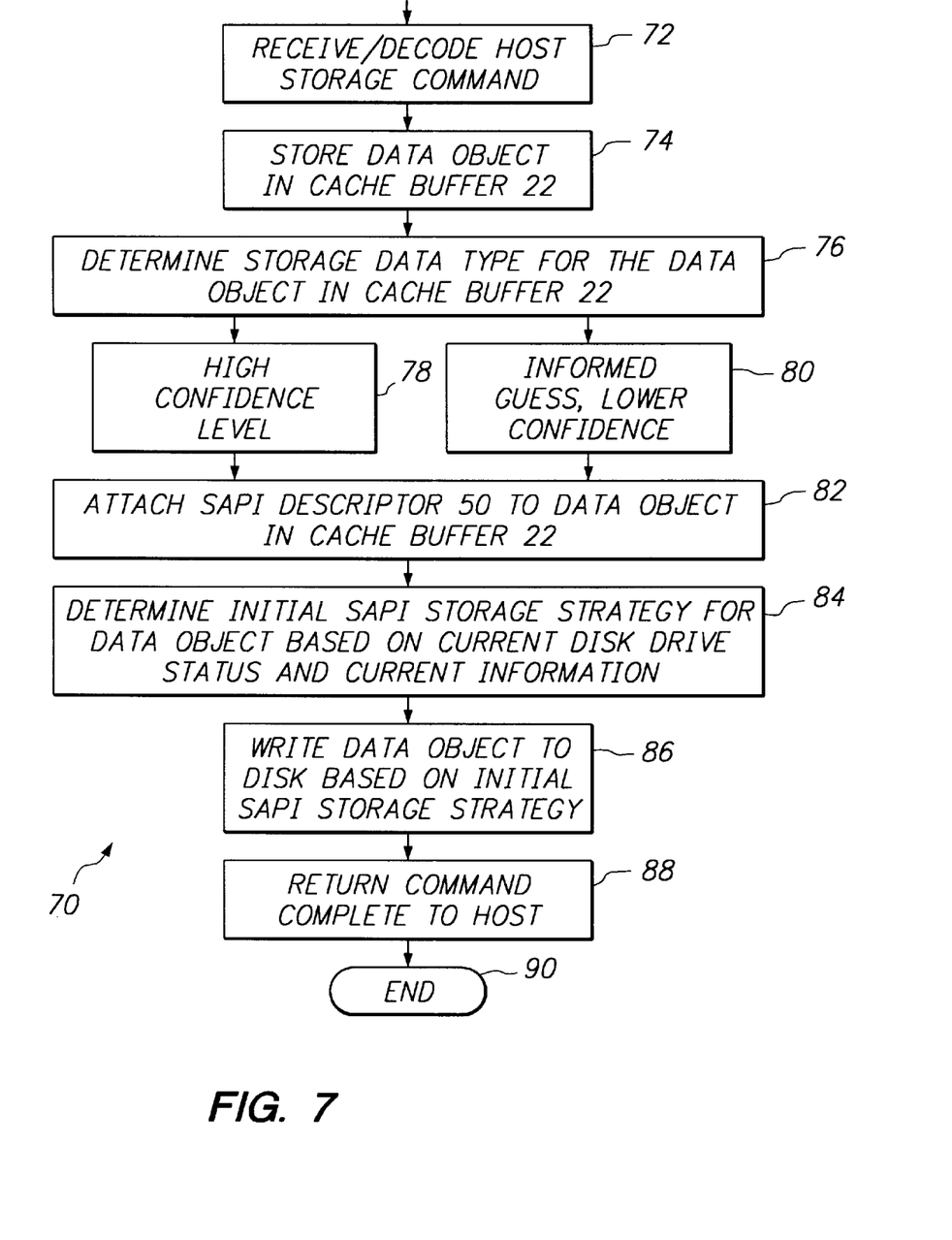
FIG. 7 is a flow diagram of a SAPI write command determination routine carried out in accordance with principles of the present invention.

Turning now to FIG. 7, the SAPI implementation engine 16 may perform an initial SAPI determination function 70 for a write command. At a step 72 the SAPI engine 16 receives and decodes incoming storage commands from a host attached to the interface 14 for a particular data object. The command 6 may be separate from, or it may accompany the data object. While the SAPI engine 16 is decoding the command, the data itself is stored temporarily into an available temporary (volatile) storage location of the cache buffer 22 of drive 10 at a step 74.

Based upon decoding the host command, and by referring to any other available information already developed about the particular object, or its LBA, etc., the SAPI engine 16 assigns or verifies an initial SAPI descriptor for the object at a step 76. If, for example, the host has already provided a SAPI descriptor 50, or if the data object is determined to represent a known data type within a particular operating system environment, as from decoding of the data file name or from other file meta-data transmitted by the host with the data object, then a high confidence level for the SAPI is given at a step 78.

However, if the disk drive 10 lacks presently sufficient information to provide a particular SAPI descriptor to the incoming data object, an informed guess SAPI descriptor is assigned at a step 80. The informed guess SAPI descriptor may be a best guess, or it may represent a default case which means that the drive 10 presently knows little, if anything, about the incoming data object, and this condition is flagged at step 80. The determined SAPI descriptor 50 along with confidence 52 and initial history 54 is then attached to the overhead field 21 at a step 82.

Next, at a step 84 the SAPI engine 16 determines an appropriate storage strategy and storage location(s) for the data object based on the assigned SAPI and the present state of available storage locations of the disk drive 10. This step 84 implements the mapping of primary LBAs 16 to LOAs 20 as shown in FIG. 4. If, for example, the SAPI descriptor is the default or "don't know" case, the SAPI engine 16 may determine to store the user data in a middle zone of the disk drive, which provides average drive performance. However, if repeated reads are made of the record having a default SAPI, then the SAPI engine 16 will collect statistics and the routine 70 will apply these statistics to the object and update history field 54. At an appropriate time, the SAPI engine 16 will upgrade the SAPI descriptor and increase the confidence factor, and will move the data object to a wider bandwidth/higher performance level, as by moving the data or by making other copies of the data in higher bandwidth, higher performance storage areas of the disks 30. The data object is then written to disk at a step 86, and a command complete status is returned to the host at a step 88 and the routine reaches an end step 90.

A variety of SAPIs are useful within the context of operations of the drive 10. By way of example, the SAPIs may be categorized as allocation; caching; prefetching and cache flushing; intraobject; interobject; disk statistics; peer-to-peer operations; inter disk operations; initialization; shutdown; modify parameters; system management; and, Java engine.

These SAPIs help define the properties of the data written on a storage device, such as drive 10. Some of the properties are defined statically, while others are defined dynamically. Some properties may be defined either way. In this case dynamic definition takes precedence over static definition.

Allocation SAPIs. Allocation SAPIs help the disk drive 10 allocate some amount of available storage space. Allocation SAPIs may depend upon some criteria that is specified, or they may be independent of any criteria. For example, the allocation SAPIs may allocate an extent of object size on outer zones, on inner zones, on middle zones, near an outer zone, near an inner zone, near the middle but towards the outer zones, or near the middle but towards the inner data zones.

Caching SAPIs. Caching SAPIs enable cache management by giving hints to the disk drive 10 as to a particular caching policy that should be followed for a particular data unit. Cache flushing SAPIs enable the disk drive 10 to create free space in the cache buffer 22 for further data unit caching. Caching SAPIs include read/don't cache, no prefetch; read, don't cache, prefetch; read, cache, no prefetch; read, cache, prefetch; write back, cache, allocate for prefetch; write back, cache, no allocation for prefetch; write through, cache, allocate for prefetch; write through, cache, no allocation for prefetch; write through, don't cache, allocate for prefetch; write through, don't cache, no allocation for prefetch; and, flush cache, all.

Intraobject Properties SAPIs. These SAPIs define the properties of an extent that is allocated or an object that is written to disk 30. Some examples of the properties are data type of the data object, or types of storage operations that are permitted on the data object. These properties are beneficially used by the disk drive 10 to optimize storage usage and access. For example, intraobject properties SAPIs include:

Data object type—ASCII, binary, audio, video, text.

File extension of the object—.exe, .doc, html, etc.

File type—sequential, random, mostly sequential, mostly random.

Permitted Operations—read only, read mostly, read/write, write mostly.

Copy—master, first copy, second copy . . . ,

Metadata—i.e. information about the data supplied by the host operating system or application.

Expected frequency of usage—

Static cache hints—

First block/Last block—informs of the first block and last block in a contiguous linear logical addressing space which provides the file boundaries.

Interobject SAPIs. These SAPIs define the relationship between different objects. These defined relationships help allocation of the objects and prefetching of the objects. Examples of interobject SAPIs include: place the present object into storage directly after object n; place this object directly before object m; place this object near object r; place this object anywhere; fetch objects m, n and r together.

Disk Statistics SAPIs. These SAPIs enable fetching of different information and statistics about the data object. For example, disk statistics SAPIs include: number of objects accessed by host since disk drive initialization; total storage space already used; number of contiguous regions used/available; largest object addressed by host; smallest object addressed; average object addressed; total number of read/write operations since initialization; number of reads since initialization; number of writes since initialization; number of reads in last time measurement unit; number of writes in last time measurement unit; average read object size; standard deviation of read object size; average write object size; standard deviation of write object size; cache hits since initialization; cache flushes since initialization; cache read hits since initialization; cache write hits since initialization; cache hits in last time measurement unit; cache read hits in last time measurement unit; cache write hits in last time measurement unit; cache flushes in last time measurement unit; maximum number of contiguous reads between two writes; minimum number of contiguous reads between writes; average number of contiguous reads between writes; standard deviation of contiguous reads between writes; maximum number of contiguous writes between two reads; minimum number of contiguous writes between reads; average number of contiguous writes between reads; and standard deviation of contiguous writes between reads. Other statistics are possible and are not enumerated here.

Peer-to-peer SAPIs. These SAPIs define operations between two attached storage devices, like drive 10 and a peer disk drive. The two storage devices may be of the same type, or they may be of different types. For example, the devices may be disk drive—disk drive, or disk drive—tape drive, or CD-ROM—disk drive, etc. Examples of peer-to-peer SAPIs include: copy from device A to device B—from list of objects—to list of addresses and extents; copy from device A to device B and verify—from list of objects—to list of addresses and extents; copy and delete—from list of objects—to list of addresses and extents; copy, verify and delete—from list of objects—to list of addresses and extents; mirror these objects on storage devices N, stripe these objects over devices B, C, D, E, F, G, etc.

Intra-storage Unit Operations: These SAPIs enable internal data copying operations to be carried out within the disk drive. Examples of these SAPIs include: copy from/to—from list of objects to list of addresses and extents; copy from/to and verify—from list of objects to list of addresses and extents; copy from/to and delete—from list of objects to list of addresses and extents; copy from/to, verify and delete—from list of objects to list of addresses and extents; mirror (replicate) these objects on the disk n times; mirror these objects on the disk and either lock or unlock all mirror copies on write.

Initialization Operations: These SAPIs are used when the drive 10 is initialized. They statically set up desired properties of the drive 10 and prepare it for its use as an intelligent storage device.

Figure 8:
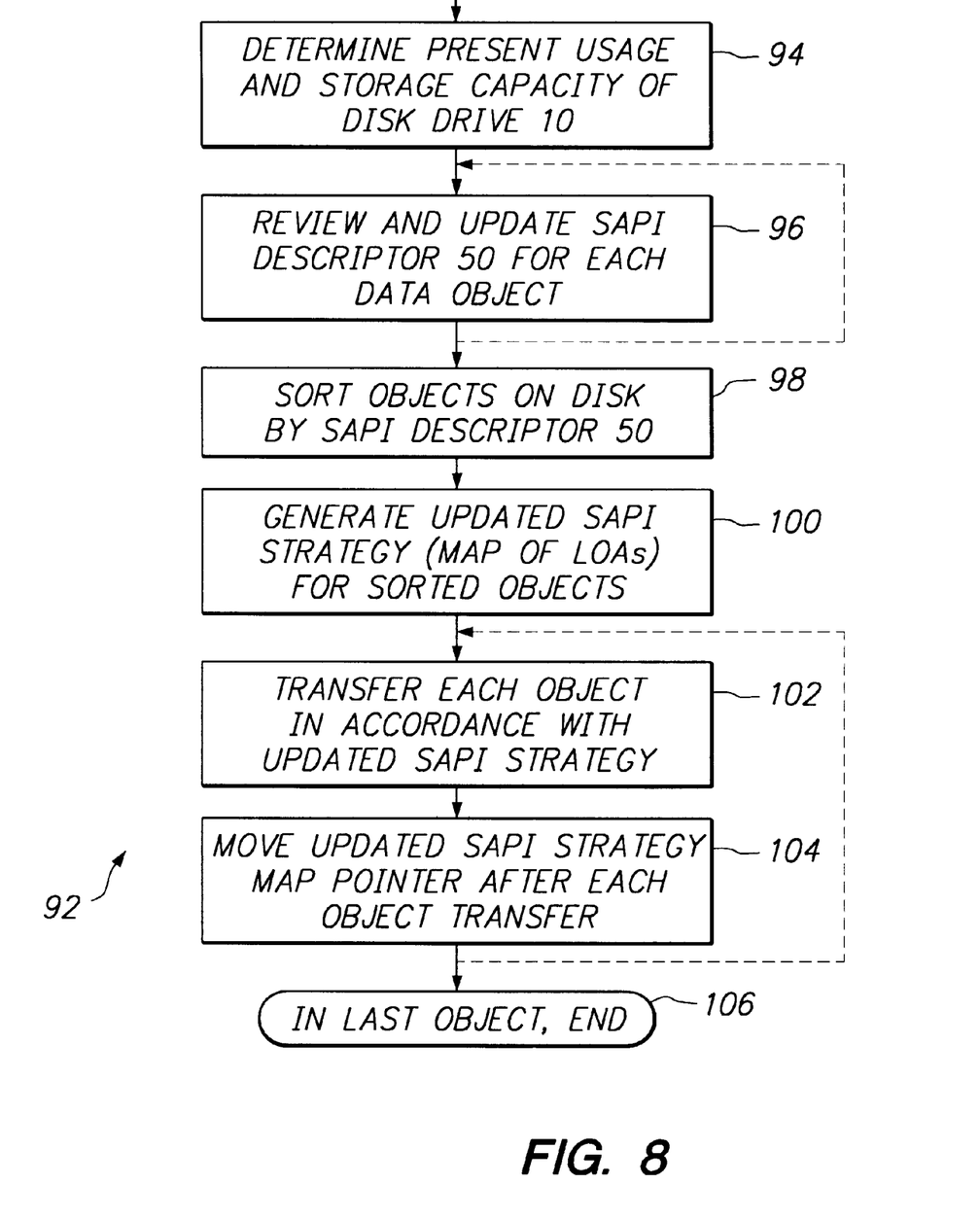
FIG. 8 is a flow diagram of a SAPI disk drive housekeeping routine carried out by the FIG. 2 disk drive in accordance with principles of the present invention.

FIG. 8 sets forth a SAPI housekeeping routine 92 which is periodically executed by the SAPI implementation engine 16 of the disk drive 10. This routine periodically reviews and reorders the data objects stored on the disk, based upon a global view of the various SAPI descriptors associated with these data. At a step 94, the housekeeping routine 92 determines the present disk drive usage and remaining data storage capacity. This information enables the SAPI implementation engine 16 to make intelligent decisions concerning storage strategies for each of the SAPI descripted data objects presently stored.

Next, at step 96 the housekeeping routine 92 performs an update process upon the SAPI descriptor 50 for each data object, based upon information accumulated about the data object since the last housekeeping routine or since the data object was recorded to disk, whichever last occurred. This analysis may be based on statistical SAPIs collected regarding the data unit which are recorded in the history field 54, or the analysis may be based upon a determined association with other data object which appear to the SAPI engine 16 to be related to the particular unit. SAPI descriptor determination routines run in the initial determination process 70 may be used to provide updated SAPI descriptors. An updated SAPI descriptor is then written into the SAPI descriptor field 50 for each data object undergoing updating at step 96.

The SAPI engine 16 then sorts the records on the disks 30 by SAPI descriptor at a step 98, in order to determine the number and extents of data objects bearing each current/updated SAPI descriptor. A step 100 is then performed to generate an updated SAPI storage strategy including building a revised map of LOAs 20 for the sorted data objects. A step 102 then causes each data object to be relocated (or not) in accordance with the updated SAPI storage strategy. This step 102 is followed by a step 104 which moves a record pointer in the updated SAPI strategy map after each record is transferred or handled in accordance with the revised SAPI strategy. Since the housekeeping routine 92 runs as a background routine, which is carried out on a time and storage-space available basis, it is subject to being interrupted when commands are being received and handled from the host. Accordingly, the housekeeping routine 92 may loop around step 96 and between steps 102 and 104 until the last record has been reordered or otherwise handled, as indicated by the dashed line in FIG. 8. After the last record has been handled, an end step 106 is reached, and the program pointer returns to the top of step 94 where it waits until the housekeeping routine is again executed. Execution of the routine 92 is carried out in a periodic fashion as scheduled in relation to primary data storage activities of the disk drive 10.

Figure 9:
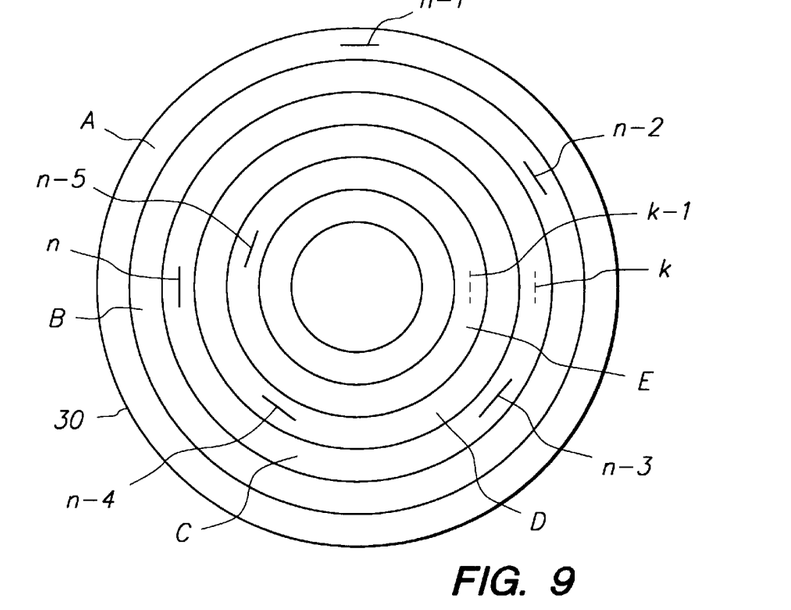
FIG. 9 is a storage surface layout plan for one of the storage surfaces of the disks of the disk drive shown in FIG. 2 showing reordering of record storage in accordance with the FIG. 8 housekeeping routine.

Returning to the examples earlier presented in conjunction with FIG. 4, FIG. 9 illustrates a record layout plan which is reordered by operation of the FIG. 8 process flow. Initially two data objects n and k are received from the host, and do not have current, high confidence SAPI descriptors. These objects n and k are therefore recorded within zone C of a disk surface, n shown as a solid line extent, and k shown as a dashed line extent. By virtue of the step 96, it is determined that object n comprises write infrequently, read frequently data, and therefore a SAPI descriptor 50 is changed from a default case to an appropriate SAPI descriptor as determined for the SAPI implementation engine 16 because of historical information, or because of updated information concerning related other data objects known to the engine 16. Also, step 96 determines that the object k is one which may be written frequently, but is virtually never read, and therefore an appropriate SAPI descriptor is provided for object k.

Those skilled in the art of disk drive formatting will understand and appreciate that the actual LOA locations and one-to-one mapped drive physical storage space are highly dependent upon drive geometry and actuator physics. For a certain drive geometry, such as the geometry of the disk drive 10, there is an optimum layout for each of n objects where n is a known variable. This optimum layout is available to the SAPI implementation engine 16 as predetermined information. While FIG. 9 shows only one surface, it is apparent that similar principles apply to storing data on multiple surfaces where head switch/settle times are taken into account as part of the drive geometry and physics.

The reordering steps carried out by process steps 100, 102, and 104 cause the disk drive storage surface to be changed. In the example of FIG. 9, multiple copies n–1, n–2, n–3 n–4 and n–5 are distributed at available strategic locations across the storage surface, so that the head 28 is never far away from an object. After the reordering of object n, it may or may not remain at its original location within zone C, and it may be written on multiple storage surfaces within the stack of disks 30 in a multi-disk, multi-surface disk drive, such as drive 10. After the reordering of object k, on the other hand, the object is rewritten as object k–1 in low bandwidth zone E of a storage surface, and the original space occupied by object k is returned to available space in the updated SAPI allocation map established at step 100 of the FIG. 8 process. Therefore, those skilled in the art will appreciate that the disk drive 10 is continually updating and refining the storage strategy, based upon refinement of SAPI descriptors of the data objects already stored and based upon updated information about the disk drive, such as remaining disk storage space over which the records may be distributed. As the disk capacity is consumed by user data objects, the ability of the updated SAPI strategy map to allocate multiple LOAs for a single object diminishes. When the drive reaches a full storage capacity, it necessarily performs as a conventional disk drive. Up to that point, however, performance enhancements may be obtained at the expense of otherwise unused, or inefficiently used storage capacity by practice of the principles of the present invention. Even the case of the full or mostly full disk drive will have a practical advantage of ordering of frequently called for disk files in wide bandwidth locations of the disks and infrequently called for disk files in low bandwidth locations, thereby enhancing performance over a drive in which the files are distributed in a random fashion or on a first come, first served basis.

Figure 10:
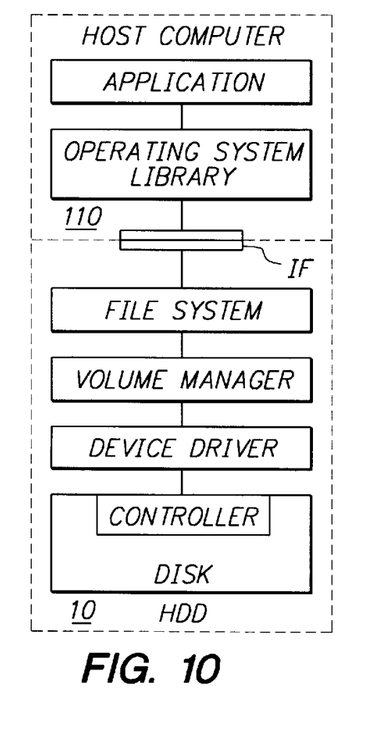
FIG. 10 is a simplified block diagram showing the hardware/software boundary interface for a disk drive incorporating a SAPI engine in accordance with principles of the present invention.

Implementation of the above described method according to principles of the present invention effectively enables system designers to raise the hardware/software interface boundary between the HDD and the host system, thereby enhancing performance of the disk drive 10. FIG. 10 shows a simplified block diagram illustrating a "raised" hardware/software interface when compared to a conventional prior art host computing system and disk drive, such as that shown in FIG. 1A. As shown in FIG. 10, the hardware/software interface has been raised upwardly so that the file system, volume manager and device driver are now included as part of the hard disk drive 10. This configuration can enhance overall performance of the HDD since the file system, volume manager and device drive, by being a part of the disk drive, are advantaged by knowing about and utilizing the geometry of the disk drive directly. This raising of the hardware/software interface is a result of the SAPI engine's characterization/analysis of data objects and the mapping of the data objects using LOAs. In conventional disk drives, as described above in Background section, the drives use a fixed block architecture (FBA) to map and store fixed sized data blocks (512 bytes/block) on the disk. Such an FBA is impractical since the higher levels of the host system, such as the applications, typically require arbitrarily sized data units. However, the SAPI engine of the present invention works with data objects which can be arbitrarily sized data units, and performs an analysis on the data object to identify the type, including size, of the data object. This information obtained by the SAPI engine on the drive is then used more efficiently to map the data object to a LOA 20 on the physical device.

Another advantage of the SAPI implementation in accordance with principles of the present invention is that the resulting shift of the file system, volume manager and device driver onto the disk drive moves the name space and allocation processing of the physical device space onto the drive itself. Incorporation of the SAPI engine causes the file system functions to be split such that half of the file system manages the "name space" for the drive and the other half manages allocating where the LOAs belong on the physical space of the drive 10.

Figure 11:
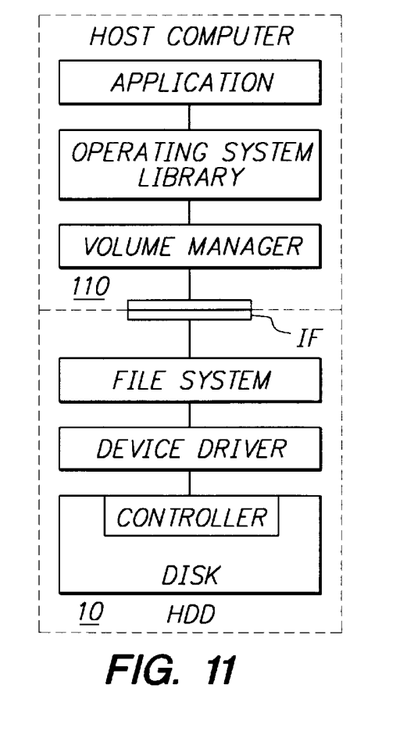
FIG. 11 is a simplified block diagram showing an alternative hardware/software boundary interface for a disk drive incorporating a SAPI engine in accordance with principles of the present invention.

In an alternative implementation of the SAPI engine, the volume manager functions can be moved back into the host computing system 110 as a software function. This embodiment is schematically shown in FIG. 11. In such an embodiment, the volume manager effectively becomes a virtual file system interface and has a spanning function. In this respect, when an application requires putting something on the device which is larger than the device, the volume manager operates to logically combine objects so that a device is obtained which is large enough to accommodate what the application requires.

As the functions of the file system, volume manager and device driver are moved down on the drive, there are steps that must be taken to rearrange how the pieces are physically constructed. Typically, the HDD requires controller functions which are separate from the instructions and data streams of the host system and are included as part of the head disk assembly (HDA) of the HDD. Implementation of the SAPI engine in accordance with principles of the present invention require the functions of the file system, volume manager and device driver to be included as part of the HDD, and as described above, the functions are included as part of the drive's ASIC. In an alternative embodiment, the file system, volume manager and device driver functions can be implemented as part of the HDD controller on the drive. However, either embodiment, from the machine's point of view, is logically the same, in that the relocated functions are included as part of the device regardless of where they are physically located.

In operation, the above described SAPI engine can be implemented in either a covert or overt manner. What is meant by covert or overt implementation has to do with how host computing system makes use of the SAPI engine. In a conventional system, the applications of the host computing system aren't aware of the data structures used by the HDD and don't know enough to make use of any new functions of the HDD. In a covert implementation of the present invention, applications are included which can monitor the functions of the HDD and arrange to use the storage effectively based on what is learned. In an overt approach, the applications or operating system library of the host computing system is rewritten to use the new interface.

To those skilled in the art, many changes and modifications will be readily apparent from consideration of the foregoing description of a preferred embodiment without departure from the spirit of the present invention, the scope thereof being more particularly pointed out by the following claims. The descriptions herein and the disclosures hereof are by way of illustration only and should not be construed as limiting the scope of the present invention which is more particularly pointed out by the following claims.

What is claimed is:

1. A method for storing a multiplicity of user data units characterized by at least one of type or size on a mass storage device, the method comprising the steps of:

receiving a data unit for mass storage on the mass storage device, decoding descriptor information accompanying the data unit, if any, wherein the descriptor information describes or provides an indication of a particular one of a plurality of data types for the data unit, determining a storage application programming interface (SAPI) descriptor for the data unit based at least in part upon decoding of the descriptor information, appending the SAPI descriptor to the data unit before storage upon a non-volatile storage medium of the mass storage device, selecting a storage algorithm from a plurality of predetermined available storage algorithms based upon the SAPI descriptor appended to the data unit and currently available storage locations on the non-volatile storage medium, determining at least one storage location of the non-volatile storage medium to store at least one copy of the data unit, and recording the data unit at the at least one storage location.

2. A method for storing a multiplicity of user data blocks characterized by at least one of type or size on a hard disc drive, the method comprising the steps of:

receiving a data block into a temporary cache buffer storage area of the disc drive, analyzing the data block to determine a likely one of a plurality of predetermined data types for the data block, determining a storage application programming interface (SAPI) descriptor for the data block based at least in part upon a data type for the data block determined from the analyzing step, appending the SAP(descriptor to the data block before storage upon a rotating disc of the hard disc drive, selecting a storage algorithm from a plurality of predetermined available storage algorithms based upon the SAPI descriptor appended to the data block and currently available storage locations on the rotating disc, determining at least one storage location of the rotating disc to store at least one copy of the data block, and recording the data block at the at least one storage location.

3. The method set forth in claim 2 wherein the step of analyzing the data block to determine a likely one of a plurality of predetermined data types includes the steps of locating and decoding a logical file descriptor from an application program of a host computing system wherein the logical file descriptor is in logical association with the data block.

4. The method set forth in claim 3 wherein the step of locating a logical file descriptor is carried out by locating the logical file descriptor within the data block itself.

5. The method set forth in claim 3 wherein the step of locating a logical file descriptor is carried out by locating the logical file descriptor in another block which is logically or temporarily associated with the data block itself.

6. In a mass storage device including a recording and playback medium, a data recording and playback mechanism for recording one or more units of user data to the recording and playback medium and for playing one or more units of user data back from the recording and playback medium, a physical interface connecting the mass storage to an external computing environment, and an embedded digital controller means in the mass storage device responsive to control values from the physical interface for controlling the recording and playback medium, a storage application program interface (SAPI) implementation engine comprising:

data recognition means for recognizing a data unit description for the one or more units of user data received from the external computing environment via the physical interface, wherein the data unit description provides an indication of a particular one of a plurality of data types, internal data generation means for analyzing the data unit, recognized by the data recognition means, to generate an internal SAPI descriptor for the one or more units of user data based at least in part upon the data unit description, and appending the internal SAPI descriptor to the one or more units of user data, internal storage strategy selection means for selecting a storage algorithm from a plurality of predetermined available storage algorithms for storing the one or more units of user data appended with the SAPI descriptor on the recording and playback medium, and storage control means within the embedded digital controller for storing the one or more units of user data on the recording and playback medium in accordance with the selected storage algorithm.

* * * * *